United States Patent [19]
Katsuda

[11] 3,940,874
[45] Mar. 2, 1976

[54] COCKROACH TRAP

[75] Inventor: Yoshio Katsuda, Nishinomiya, Japan

[73] Assignee: Dainippon Jochugiku Kabushiki Kaisha, Osak, Japan

[22] Filed: Sept. 16, 1974

[21] Appl. No.: 506,616

[30] Foreign Application Priority Data
Sept. 24, 1973 Japan.................... 48-111011[U]
Nov. 30, 1973 Japan.................... 48-138593[U]

[52] U.S. Cl. ................................................. 43/114
[51] Int. Cl.² ........................................... A01M 1/14
[58] Field of Search ............. 43/114, 115, 121, 131, 43/107, 136

[56] References Cited
UNITED STATES PATENTS
2,340,256  1/1944  Weil...................................... 43/131
3,023,539  3/1962  Emerson, Jr........................... 43/114
3,304,646  2/1967  Staley.................................... 43/114

Primary Examiner—Warner H. Camp
Attorney, Agent, or Firm—Brisebois & Kruger

[57] ABSTRACT

A cockroach trap constructed by providing side walls surrounding a base, forming several openings in each said side wall the edges of which lie at an angle of 30 to 60 degrees apart with the apex of said angle directed downwardly, each opening being designed to serve as an entrance for the cockroaches, and providing a layer of adhesive on the surface of said base spaced inwardly of the openings.

11 Claims, 19 Drawing Figures

F I G. 12
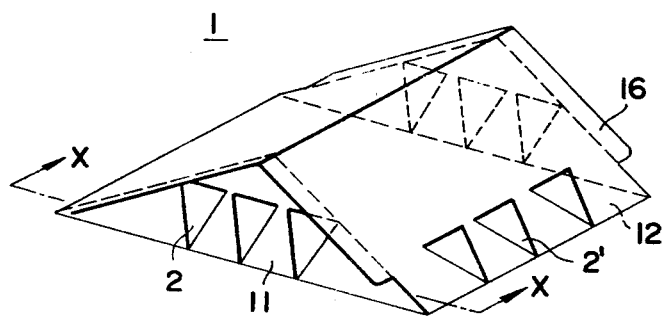
F I G. 13
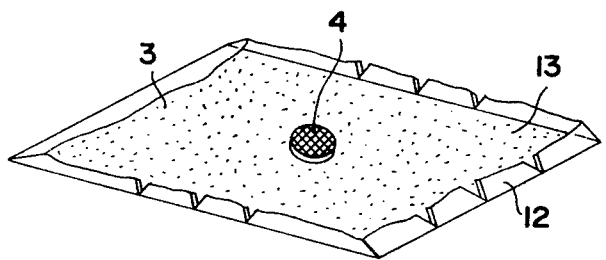

COCKROACH TRAP

BACKGROUND OF THE INVENTION

Recently, various types of traps been used for capturing cockroaches. However, these known traps are designed to capture the cockroaches alive without using any insecticide, so that these traps involve the troublesome problems of disposal of the captured cockroaches. The capture rate is also low because, according to such known systems, the cockroaches must force open the entrance door of the trap by their own efforts in order to enter the trap. In order to solve these problems, there has more recently been devised a trap of the type in which an adhesive is spread inside a box-like cardboard structure after the fashion of flypaper.

However, it has been found that, in the case of cockroaches, which differ from flies in many respects, it is hardly possible to obtain satisfactory results by merely applying an adhesive on the flat base, because cockroaches are far larger in size than flies, and crawl with the aid of feelers, so that if an adhesive layer is present in front of them, they quickly sense it with their feelers, and even if their feelers or forelimbs should be caught by the adhesive, they may escape due to the strength of their rear legs.

In order to overcome this problem, various attempts have been made, such as developing an adhesive with strong adhesion, thickening the layer of adhesive, or mixing an insecticide in the adhesive. Nevertheless, none of these attempts has succeeded in obtaining satisfactory results in practical applications.

SUMMARY OF THE INVENTION

The present invention provides an improved cockroach trap for capturing cockroaches with the use of an adhesive. This device features the provision of inverted triangular openings, or openings of a similar configuration, having walls diverging from each other at an angle of 30° to 60° and designed to serve as entrances for the cockroaches, so as to capture the cockroaches efficiently by taking advantage of the peculiarities of the cockroaches.

BRIEF DESCRIPTION OF THE DRAWINGS

FIG. 12 is a perspective view of another embodiment of the present device;

FIG. 13 is a sectional view taken along the line X—X of FIG. 12;

Figure 1:
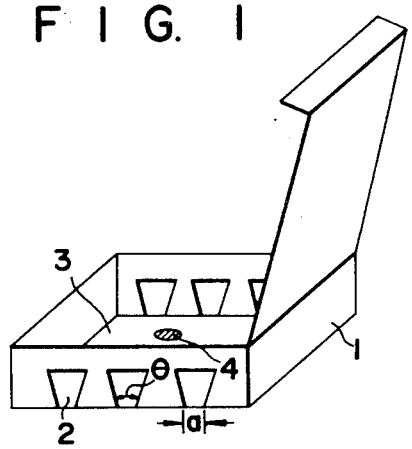
FIG. 1 is a perspective view of one embodiment of the present device.

The reference numerals and characters used in the drawings indicate the following:
- 1: main body of the cockroach trap
- 2: openings or cockroach entrances
- 3: adhesive
- 4: lure
- $a$: length of the horizontal portion of the vertex of each opening;
- $\theta$: vertex angle of the inverted triangular opening (cockroach entrance).

DETAILED DESCRIPTION OF THE INVENTION

This invention relates to a cockroach trap using an adhesive.

It has been often observed that the cockroach attracted by a lure would approach the adhesive-spread area, but upon detecting the presence of the adhesive with its feelers, it would run away. This inventor has made careful observation of the behavior of the cockroaches which were attracted to the trap, and has learned that most of the cockroaches which approached the adhesive made their escape even though they had had their feelers and/or forelimbs caught by the adhesive, and that when fleeing, they did not move back but turned the direction of the body. Therefore, if the trap were so constructed that they could not turn their body direction, they would have no other alternative but to advance and would necessarily be caught by the adhesive.

Based on these findings, the present inventor has provided openings, or cockroach entrances, of a specific configuration in the side walls of the trap and tested the effect thereof. It was found that this would produce unexpectedly satisfactory results.

Several preferred embodiments of the present invention will now be described in detail, with reference to the accompanying drawings.

Figure 2:
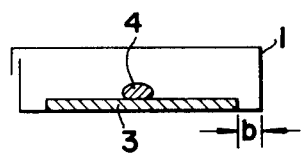
FIG. 2 is a side view thereof.
Figure 3:
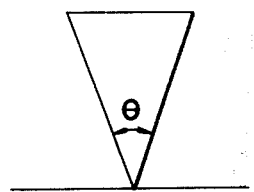
FIGS. 3 to 7 are diagrams showing examples of various openings (cockroach entrances)
Figure 4:
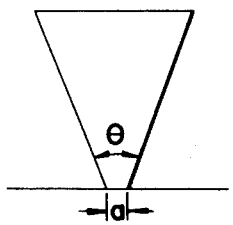
Figure 5:
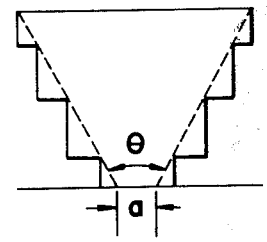
Figure 6:
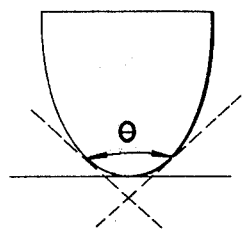
Figure 7:
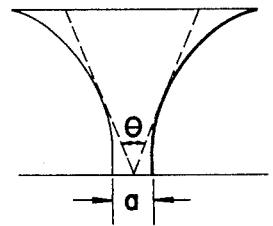
Figure 8:
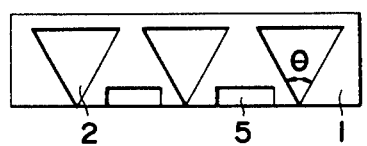
FIGS. 8 and 9 are side views of trap walls formed with sesame seed-sized cockroach entrances along with normal triangular openings.
Figure 9:
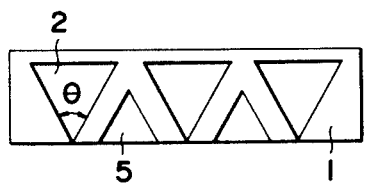

FIG. 1 shows in perspective a roach trap according to one embodiment of the present invention comprising the body 1 of the trap, openings or cutouts 2 (designed to serve as cockroach entrances), a layer of adhesive 3, and a lure 4. The letter $a$ indicates the length of the lower edge of the opening, and $\theta$ is the angle between the sides of the cockroach entrance intersecting the base. FIG. 2 is a diagrammatic side view thereof, and FIGS. 3 to 7 show openings having different shapes. FIGS. 8 and 9 are side views of trap side walls in which smaller entrances are provided along with the normal-size openings to permit the capture of small cockroaches.

The high cockroach capturing ability of the trap provided with the above-said entrances is due to the fact that when the cockroach detects the presence of the adhesive, it is already in a position where it can no longer move back.

According to the present invention, it was found that best results are obtained when, as shown in FIG. 1, the angle ($\theta$) between the sides of each triangular opening is from 30° to 60° and the distance $a$ of the bottom of the opening is less than 5 mm, with the horizontal distance $b$ (see FIG. 2) from each opening 2 to the adhesive zone being less than 10 mm.

Most of the cockroaches can be captured by a trap according to the present invention provided with the above-described openings of specific configurations, but in the case of undersized cockroaches or croton bugs which are the same size as a sesame seed or an adzuki bean, they cannot escape if a feeler or a forelimb touches even lightly with the adhesive because they are feeble in bodily strength, so that by providing small openings of any suitable shape (such as circular, rectangular, triangular or polygonal) along with the openings of said specific configuration in each side wall of the trap, as shown in FIGS. 8 and 9, it is possible to capture all sorts of cockroaches irrespective of bodily size. One or more openings or cockroach entrances 2 may be provided in each side wall of the trap 1. If a lure 4 is placed in the center of the adhesive layer, the capturing effect is improved. The adhesive 3 may be applied beforehand on the base paper and covered with a release paper which is removed when using the trap, said base paper being exchangeable as required. Or such adhesive may be contained in a tube so that it is spread on the base paper at the time of use. The base paper may be cardboard, plastic sheet material or the like, and its surface is preferably roughened to allow the application of a greater amount of the adhesive.

In a cockroach trapping system using an adhesive, it is preferable for convenience in use to cover the adhesive surface with release paper and to remove such release paper at the time of use. However, when the base paper on which the adhesive is spread is made of cardboard or plastic sheet, it is technically impossible to employ such a release paper method. This is because the adhesive is a viscous liquid which has the properties of showing an unyielding resistance when sudden strong force is applied, but tending to flow easily when a weak force is continuously applied. Therefore, if the base paper is made of cardboard or another thick paper, the adhesive may soak through the back side of the base paper in long term use, while in the case of a flat impermeable sheet such as a plastic sheet, if a thick layer of adhesive is applied thereon and covered with release paper and such assembly is left as it is for a long time, the adhesive could flow out from between the base paper and release paper. Thus, use of release paper imposes certain restrictions on the amount and thickness of the adhesive that can be applied, and within such limited range of amount and thickness of the adhesive, it is hardly possible to capture the cockroaches.

As a result of many studies and experiments, this inventor has found that a closed cell synthetic resin sheet is best suited for use as the base paper of the adhesive. The open-cell synthetic resins, such as open-cell foamed urethane, which is widely used as a construction material or a heat insulator, is not suited for the object of the present invention as the adhesive penetrates into such foamed resin sheets to impair its surface adhesiveness.

The closed cell synthetic resin sheets of the present invention are made by foaming urea resin, polyethylene, styrol, and like resins. Its excellent pliability permits easy capture of the cockroaches, and once captured, the cockroaches can no longer escape. Also, when using such closed cell synthetic resin sheets, the amount of adhesive required for effective cockroach capturing can be halved as compared with the case of using pasteboard or the like as the base paper. Furthermore, the adhesive won't diffuse during storage or use by reason of the high affinity between the closed cell synthetic resin and the adhesive.

Figure 10:
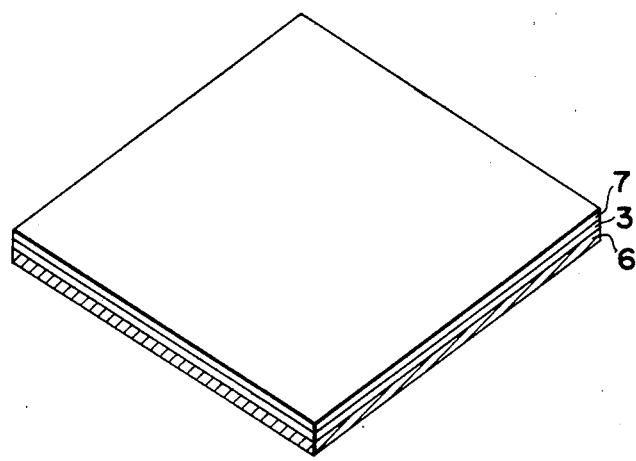
FIG. 10 is a perspective view showing an example of a trapping plate.
Figure 11:
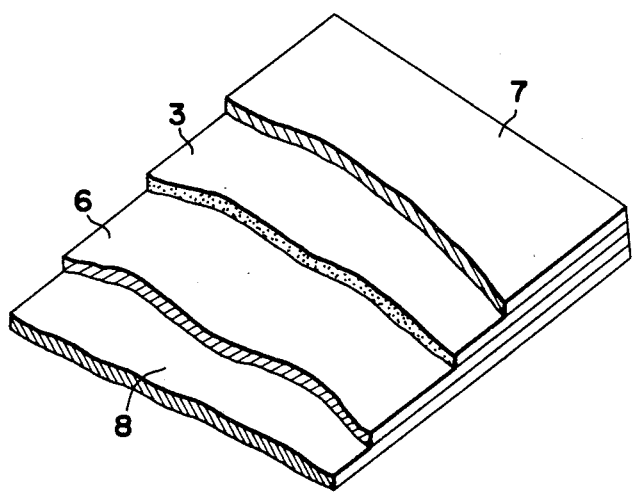
FIG. 11 is a perspective view, with parts broken away, showing another example of a trapping plate.

The cockroach trap according to the present invention may be made by first forming the body portion 1 of the trap by using foamed polystyrene paper as the closed cell synthetic resin plate and then applying an adhesive over the bottom surface of the body portion 1. It is also possible to separately prepare a capture sheet such as shown in FIGS. 10 and 11 and then replaceably locate it in the trap body 1. In the case of FIG. 10, an adhesive 3 is spread over the surface of a synthetic resin sheet having closed cells therein, and release paper 7 is placed thereover to thereby form a capture plate, and at the time of use, the release paper 7 is removed and the plate with the exposed adhesive layer thereon is placed in the trap body 1. In the embodiment of FIG. 11, a backing 8 such as Kraft paper, cardboard or synthetic resin plate is further laminated to the back of the closed cellular synthetic resin sheet 6 of FIG. 10. The effect of using such a closed cell synthetic resin sheet as the base is described in Test Example 3 hereinafter described.

The adhesive is composed mainly of such materials as natural rubber, synthetic resin, vinyl acetate or the like which may be used either singly or in admixture, with the addition of a minor proportion of a tackifier, plasticizer and anti-aging agent. This cockroach capturing sheet is made by applying an adhesive to a closed cellular synthetic resin plate 1 either directly or through transfer from the release paper, then pasting thereon a sheet of release paper 3 so as to cover the entire surface of the adhesive, and then cutting the plate into a desired size and shape.

One embodiment of the present invention will now be described in detail with reference to the accompanying drawings.

After taking into consideration the above-said peculiarities of the cockroaches, a hollow trigonal trap body 1 having vertical end faces 11, 11 and sloping side faces 12, 12 inclined at an angle of 25 to 35 relative to the base 13, that is, relative to the horizontal, was constructed as shown in FIG. 12. Then triangular openings or cockroach entrances 2, 2, 2', 2', . . . having apices with an interior angle of 30° to 60° were formed in each of said faces at locations close to the base edge, and an adhesive was spread over the entire surface of the bottom plate 13 including the parts immediately below the lowermost apices of said triangular entrances 2, 2, 2', 2' . . . , with a lure 4 being placed at the centre of said bottom plate 13 (see FIG. 13).

According to the trap of this arrangement, the cockroach, attracted by scent of the lure, crawls up the wall of the end face 11 or side face 12 and tries to enter the trap from a suitable portion of one of the triangular openings 2, 2' where the body of the cockroach can pass, but since each end face 11 and side face 12 rise up vertically or at a certain angle relative to the horizontal, its feelers for sensing the object ahead cannot touch the base 13, and hence the cockroach tries to advance further into the trap from the opening until its feelers or forelimbs reach the bottom to feel for the object. However, as soon as the feelers or forelimbs touch the bottom, they become stuck to the adhesive on the bottom, so it attempts to escape by rapidly turning back, but as such turning of the body is obstructed by both edges of the equilateral triangular opening, the cockroach is obliged to advance, resulting in all of its limbs sticking to the adhesive. Thus, the cockroach becomes unable to move at all and is captured.

As described above, the cockroach trap according to the present invention is provided with openings or cockroach entrances in all four sides of the trap, so that it can be set at any place and in any direction. Also, since each of such openings is provided close to the edge of the bottom plate and has an apex with an interior angle of 30° to 60°, it is possible to capture cockroaches of all sizes. The present device is far more effective than any of the known types of cockroach traps.

The most important feature of the present device is the provision of triangular entrances or entrances having sides 2, 2, 2', 2', which slope downwardly and inwardly close to the edge of the bottom plate such that the interior angle of the vertex of the isosceles triangle defining these entrances is 30° to 60°. Although the inverted equilateral triangular entrances are provided in the embodiments of FIGS. 12 and 14, the part other than the lowermost vertex portion can take any shape as exemplified in FIG. 15 $a$, $b$, $c$ and $d$, provided that said vertex has the above-defined interior angle. Provision of said openings close to the bottom edge and selection of the above-defined interior angle of the vertex are intended to permit easy entrance of small-sized cockroaches. Large-sized cockroaches are supposed to creep into the trap from the wider space at the upper part of the opening.

The slant of the sides 12, 12 is intended to facilitate the entrance of the cockroaches into the trap when it is set adjacent room wall or other like structure. But as trouble occurs when the trap is set with one of its vertical end faces 11, 11 facing a wall or like structure, it is desirable to provide eaves 16 with their lower end cut off as shown in the drawings, so that even if one of the end faces 11 is placed facing the wall, a sufficient space is formed between said end face and wall to allow the cockroaches to pass therethrough and enter the trap from one of the entrances 2, 2, . . . .

Figure 14:
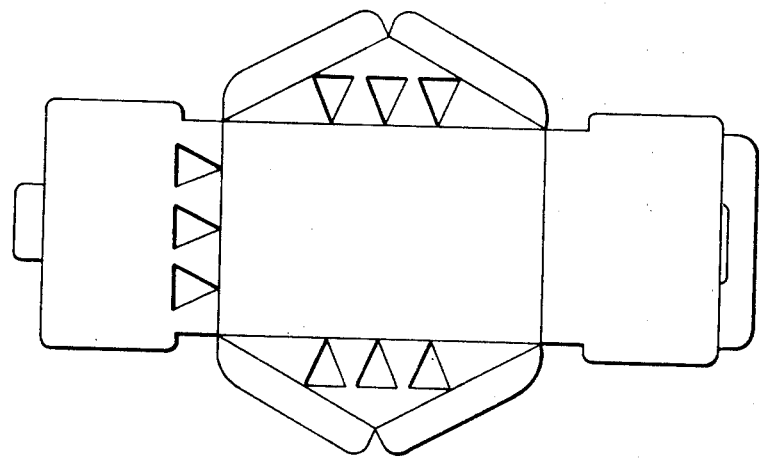
FIG. 14 is a developmental view of the structure of FIG. 12.
Figure 15:
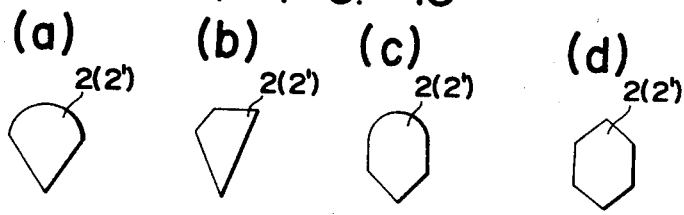
FIGS. 15a—15d are plan views showing various configurations of the entrance openings.

The cockroach trap of the present invention can be made from paper or plastic sheet. When made from a sheet of paper, it is preferable to cut such paper sheet to form a pattern 40 such as shown in FIG. 14 so that the user can easily form the trap by bending and applying a pressure-sensitive adhesive to the joined parts. The present device can be also embodied in the form of a hollow pyramid, such as a triangular or quadrangular pyramid. It is preferred that the trap of the present invention be roofed as in the shown embodiments, but the cockroach capturing efficiency of the present device is not affected according to whether the roof is provided or not.

In order to corroborate the effectiveness of the present device, the results of several tests are described below.

TEST 1

50 imago and 50 larvae of the smoky-brown cockroach were freed in a room about 12 m² shut off from external light, and 1 hour later, 20 different types of traps having cockroach entrances (openings) with different values of $a$ and $\theta$ as shown in FIG. 1 but in all of which the value of $b$ as shown in FIG. 2 as a zero, were divided into five groups (each group comprising the traps with the same value of $\theta$ and assigned as one experimental unit), and set simultaneously in said room. This experiment was repeated five times, and the number of cockroach captured was counted.

TABLE I

| a | θ | Angle | | | |
|---|---|---|---|---|---|
| | | 20° | 30° | 60° | 80° |
| Length of the base of | 0 mm | 46 | 93 | 99 | 68 |
| | 3 | 58 | 108 | 106 | 69 |
| | 5 | 42 | 97 | 98 | 52 |
| entrance | 7 | 33 | 72 | 68 | 36 |
| | 10 | 40 | 31 | 39 | 30 |

It was observed that if $a$ is substantially larger than 5 mm, specifically, as large as 7 mm, there were many cockroaches who turned back at the entrance, and that if $\theta$ is either smaller than 30° or greater than 60°, the number of cockroaches captured was markedly reduced. These facts show that the best results are obtained when $a$ is smaller than 5 mm and $\theta$ is from 30° to 60°.

TEST 2

Four different types of traps having the cockroach entrances (openings) with constant values of $a$ and $\theta$ ($\theta = 60°$ and $a = 3$ mm, with which good results were obtained) but variations in the value of $b$ were set in the same room as used in Test 1. This experiment was repeated five times, and the number of cockroach captured in each trap was counted.

Table 2

| b | Number of experiments conducted | | | | | Total |
|---|---|---|---|---|---|---|
| | 1 | 2 | 3 | 4 | 5 | |
| 0 mm | 20 | 19 | 21 | 17 | 18 | 95 |
| 5 | 18 | 22 | 20 | 19 | 23 | 102 |
| 10 | 17 | 19 | 23 | 13 | 15 | 87 |
| 15 | 6 | 6 | 11 | 9 | 2 | 36 |

The catch was few when $b$ was 15 mm. This is probably because the cockroaches, particularly the small-sized ones, which have once entered the trap, turned back without advancing toward the adhesive. For best results, therefore, $b$ should be less than 10 mm.

TEST 3

Tests were conducted by using an adhesive base made from pasteboard and one made from a closed cell foamed synthetic resin sheet.

50 imago and 50 larvae of the smoky-brown cockroach were freed in a room about 12 m² shut off from external light, and 1 hour later, the roach-capturing plates A and B were set at the same distance from the room wall and at equal intervals from each other. These plates were left in the room for one night, and the number of cockroaches captured by the respective plates was counted. This test was repeated five times.

Capture papers A — An adhesive was applied in an amount of 4 or 8 grams on a square base paper measuring 13 cm on each side, and 1 gram of lure was placed in its centre.

Capture plates B — The same adhesive as was used on capture papers A was applied in an amount of 4 grams on each plate made by laminating a 2 mm thick closed cell foamed polyethylene sheet (same dimensions as the base paper), to the square base paper with measuring 13 cm on each side, and 1 gram of lure was placed in the centre of the plate.

Table 3

| | Capture papers A | | Capture plate B |
|---|---|---|---|
| | 4 g | 8 g | 4 g |
| 1 | 2 | 7 | 8 |
| 2 | 1 | 6 | 4 |
| 3 | 3 | 15 | 18 |
| 4 | 2 | 6 | 9 |
| 5 | 0 | 10 | 9 |
| Total | 8 | 44 | 48 |

The capture plates B to which 4 grams of adhesive were applied gave results comparable with those of the capture papers A to which 8 grams of adhesive had been applied. The capture papers A to which 4 grams of adhesive had been applied were so poor in tackiness that the cockroaches could escape.

These results show that the amount of adhesive required when using a closed cellular polyethylene sheet can be halved as compared with that required when using conventional cardboard.

TEST 4

The stability and cockroach capture rates of the capture plates prepared by applying an adhesive in an amount of 2 grams, 4 grams and 8 grams, respectively, on the surfaces of square bases measuring 13 cm on each side were tested.

Stability was determined by measuring the distance of displacement or shift of the release paper which was placed on the adhesive layer and then set on a 30°-gradient sloping plate for 24 hours under a static load of 30 g/cm$^2$. The cockroach capturing rates were determined in the same way as Test 3.

About 1 gram of lure was placed in the centre of each plate, and the test was repeated 5 times.

The base used was as described below, and vinyl type synthetic resin was used as adhesive.

Figure 16:
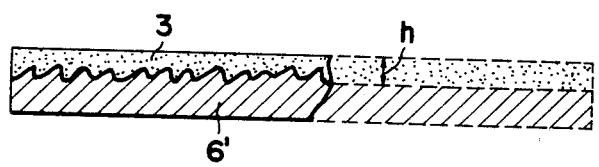
FIG. 16 is an enlarged sectional view of the base or ground paper having a rough surface.

Capture plates A: Polyvinyl chloride plate with roughened surface (see FIG. 16 where $h$ indicates coating thickness and 6' shows polyvinyl chloride plate)

Capture plates B: polyvinyl chloride plate with smooth surface

Capture plates C: cardboard

Stability is shown in Table 4 and the capture rates in Table 5 below. (The results in these tables are the averages of 5 tests).

Table 4

| Capture plate | Displacement (mm) in each amount of adhesive | | |
|---|---|---|---|
| | 2 g | 4 g | 8 g |
| A | 0 | 0 | 0 |
| B | 5 mm | 18 mm | 27 mm |
| C | 0 | 4 mm | 19 mm |

Table 5

| Capture plate | Number of roaches captured in each amount of adhesive | | |
|---|---|---|---|
| | 2 g | 4 g | 8 g |
| A | 3.6 | 9.6 | 10.2 |
| B | 3.5 | 8.8 | 8.7 |
| C | 0.2 | 1.6 | 8.8 |

As apparent from the results of Tables 4 and 5, the capture plates with a smooth surface were poor in stability, and in the case of the capture plates using cardboard, if the adhesive is applied thick enough to obtain a satisfactory capturing rate, the stability is impaired. Also, in such cardboard-using capture plates, adhesive could ooze out to the back side of the plate. In contrast with this, the base with a rugged surface according to the present invention showed excellent results both in stability and in capture rate.

I claim:

1. A cockroach trap in the form of a box defining therewithin a substantially open space, said box having a base, a layer of adhesive on said base, and side walls made of sheet material surrounding said base, said side walls defining at least one cockroach admitting opening through said sheet material having downwardly converging sides with at least the lower portions of said sides lying at an angle of 30° to 60° with respect to each other and the lower ends of said sides less than 5 mm apart.

2. A cockroach trap according to claim 1, wherein the base is square in shape and the side walls extending from two opposed sides of the base form an acute angle with said base while those extending from the other sides of the base rise vertically to form substantially isosceles triangles.

3. A cockroach trap according to claim 2, wherein at least one opening is provided in each side wall slanted relative to the base.

4. A cockroach trap according to claim 2, wherein part of each edge of each wall at an acute angle to the base is wider than the base to provide eaves.

5. A cockroach trap according to claim 1, wherein the horizontal distance from each opening to the adhesive layer is less than 10 mm.

6. A cockroach trap according to claim 1, wherein a plate to which an adhesive has been applied is removably positioned on the base of the trap.

7. A cockroach trap according to claim 6, wherein a foamed synthetic resin sheet having a closed cell structure is used as the plate on which adhesive is applied.

8. A cockroach trap according to claim 6, wherein an impermeable sheet having a roughened surface is used as the plate on which adhesive is applied.

9. A cockroach trap according to claim 1, wherein the upper surface of the adhesive layer provided on the base is covered with a sheet of release paper, adapted to be removed when the trap is set for use.

10. A cockroach trap according to claim 1, wherein the side walls are substantially vertical.

11. A cockroach trap according to claim 1, wherein the base and side walls are made from cardboard, synthetic paper or polystyrene paper and arranged to be easily assembled.

* * * * *